No. 849,508. PATENTED APR. 9, 1907.
J. B. SHORT.
EXTRACTOR FOR BOTTLE STOPPERS OR CORKS.
APPLICATION FILED OCT. 26, 1906.
2 SHEETS—SHEET 1.
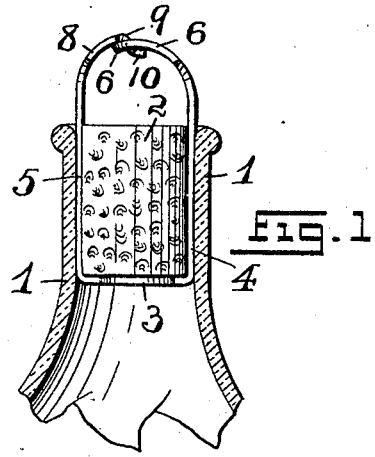
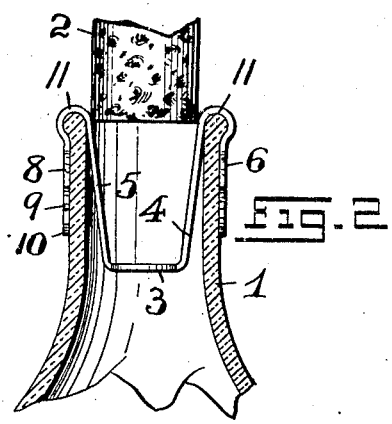
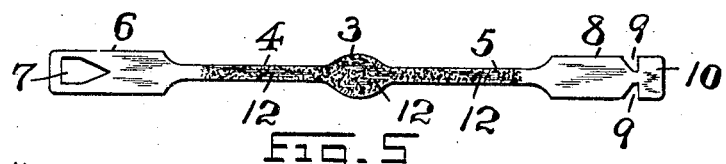
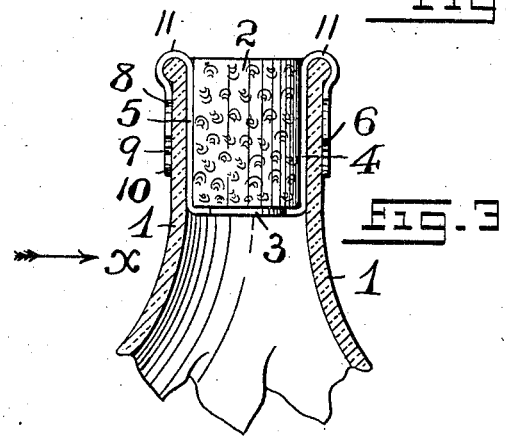
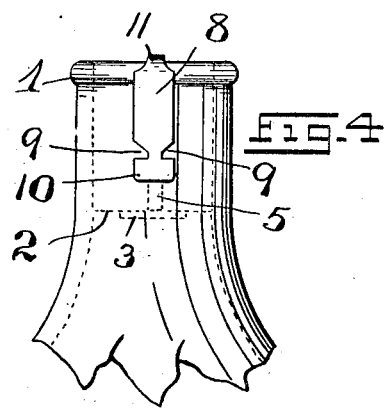
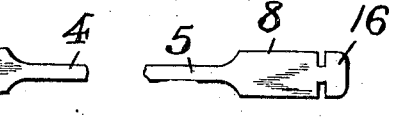
WITNESSES:
Anna H Alter
F. H. W. Fraentzel
INVENTOR:
Joseph B. Short,
BY
Fraentzel and Richards,
ATTORNEYS

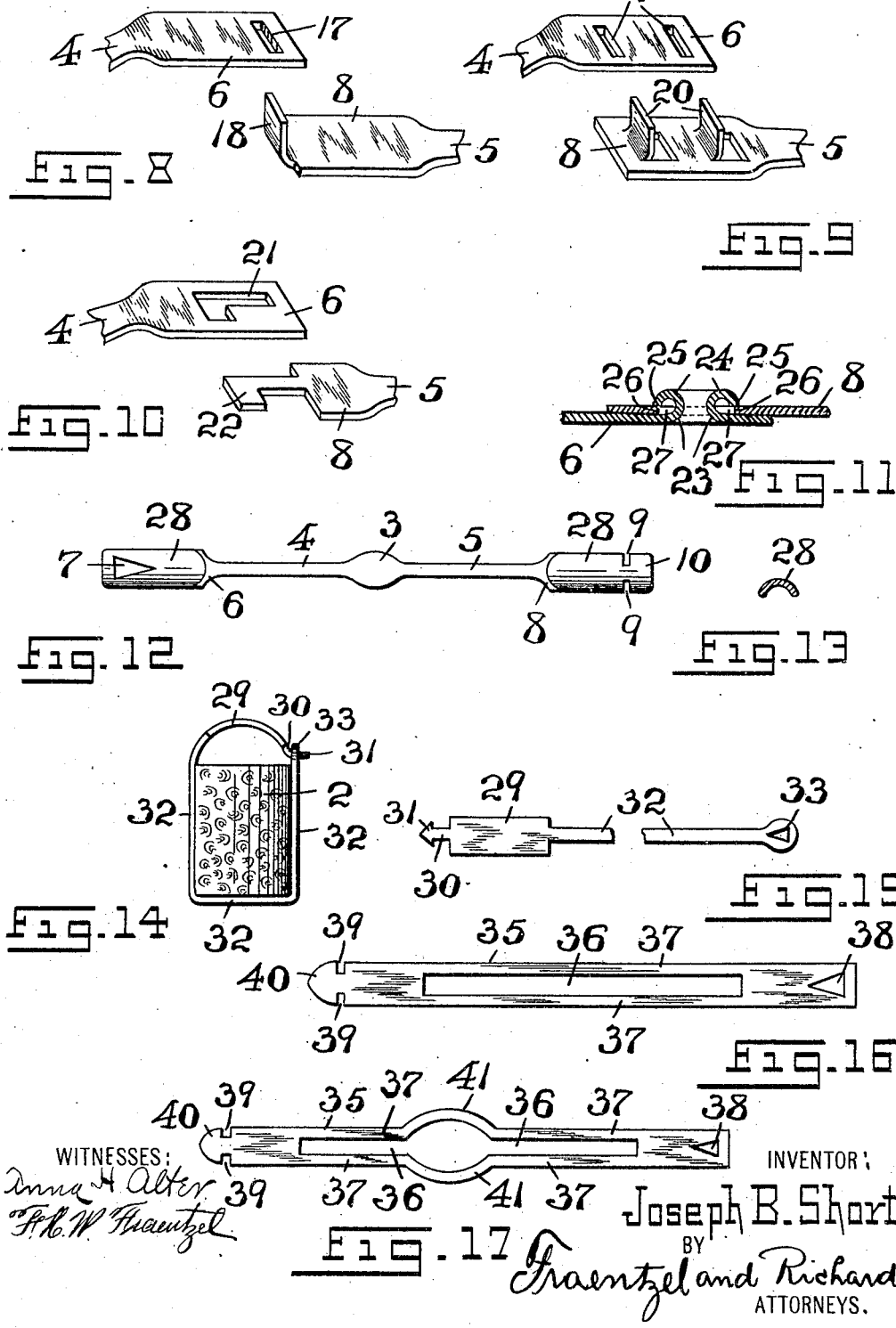

UNITED STATES PATENT OFFICE.

JOSEPH B. SHORT, OF NEWARK, NEW JERSEY.

EXTRACTOR FOR BOTTLE-STOPPERS OR CORKS.

No. 849,508.  Specification of Letters Patent.  Patented April 9, 1907.

Application filed October 26, 1906. Serial No. 340,634.

*To all whom it may concern:*

Be it known that I, JOSEPH B. SHORT, a citizen of the United States, residing at Newark, in the county of Essex and State of New Jersey, have invented certain new and useful Improvements in Extractors for Bottle-Stoppers or Corks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My present invention has reference generally to improvements in cork or stopper extractors; and the invention relates more particularly to a novel extractor or pulling device which is to be used with a cork or stopper of a tightly-sealed bottle, jar, or the like.

The invention has for its principal objects to provide a novel and simply constructed extractor which is cheaply made, but is of great strength, so as to be capable of use for the purposes for which it is intended, and which is of such a construction that it can be used in connection with the cork or stopper during the corking operation and with any of the known constructions of corking-machines without interfering with or damaging any portions of the extractor, the parts of the extractor being arranged in such a manner that there will be a space for the plunger in exerting its force upon the cork, and the corks can be placed in the hopper of the machine and fed down the chute or feeding-tube to the mouth of the bottle in the usual manner.

A further object of this invention is to provide a cork-extractor which is inseparably connected with the cork and the package until the cork is drawn and adds but a trifling cost to the package, is a great convenience, and requires no additional tool, corkscrew, or other appliance for extracting the cork or stopper.

By the use of the novel extractor embodying the principles of this invention it enables the user to put back into the mouth of the bottle in a perfect condition the drawn cork, no matter how tightly it had been fitted in the bottle, and, furthermore, to overcome and entirely eliminate the danger of the metal or other material of which the extractor is made causing corrosion or contamination by coming in contact with the contents of the package or bottle the extractor is treated with chemical preparations or with a coating of paraffin or the like, the paraffin having this especial advantage that while it helps to hermetically seal the bottle it greatly aids the cork in sliding into position and also while extracting the cork on account of the paraffin being of a lubricating or greasy nature.

Other objects of this invention not at this time more particularly enumerated will be clearly understood from the following detailed description of the same.

The invention consists in the novel cork extractor or pulling device hereinafter set forth; and, furthermore, this invention consists in the various novel arrangements and combinations of the devices and parts, all of which will be more fully described in the following specification and then finally embodied in the clauses of the claim, which are appended to and which form an essential part of this specification.

The invention is clearly illustrated in the accompanying drawings, in which—

Figure 1 is a vertical sectional representation of the mouth portion or neck of a bottle and an elevation of the usual cork and the extractor, the latter being shown in its extracting position about the sides and bottom of the cork with the detachably-connected end portions of the extractor in position when forming a pull portion or loop for the extraction of the cork or stopper from the bottle. Fig. 2 is a similar view of the mouth portion of the bottle with a side view of the extractor bent into shape for insertion in the mouth of the bottle prior to forcing the cork or extractor by means of any usual corking-machine into the bottle. Fig. 3 is a similar view of the same parts and side elevation of the stopper after it has been forced into the mouth of the bottle, showing the arrangement of the parts of the extractor with relation to the neck and mouth portion of the bottle and the driven cork; and Fig. 4 is a view of the same parts looking in the direction of the arrow $x$ in said Fig. 3. Fig. 5 is a blank form or strap of one of the constructions of cork-extractor embodying the principles of the present invention, illustrating more particularly the separable locking or holding ends of the extractor and representing in connection with the extractor-strap a coating of paraffin or a suitable chemical. Figs. 6 and 7 are plan views of the respective locking or holding ends of other extractor-straps, showing two slightly-modified forms of such locking or holding ends; and Figs. 8, 9, and 10 are perspective views of other forms of locking or holding ends for extractor-straps, the same still embodying the leading features of the present invention. Fig. 11 is a longitudinal vertical section of the two connected end portions of still another modified form of cork-extractor. Fig. 12 is a blank view of an extractor-strap of the general construction represented in Fig. 5, this form of strap, however, being made with concavo-convex end portions; and Fig. 13 is a vertical cross-section of one of said ends. Fig. 14 is a side view of a cork or stopper and an extractor of another modified form, but still embodying the principles of this invention; and Fig. 15 is a view of the blank extractor-strap shown in said Fig. 14. Figs. 16 and 17 are plan views of two other blank extractor-straps made according to this invention.

Similar characters of reference are employed in all of the above-described views to indicate corresponding parts.

Referring now to the several figures of the drawings, the reference character 2 indicates the usual cork or stopper, and 1 is the mouth portion of the neck of a bottle. The novel cork or stopper extractor is made, preferably, in the form of a strap, being made of metal of any suitable width, or any other suitable material may be used, if desired. The extractor shown in Figs. 1 to 4, inclusive, consists, essentially, of a central portion 3, from which extend in opposite directions the strap members 4 and 5, said member 4 being formed with an end piece 6, having an opening 7, preferably of the configuration shown in Fig. 5 of the drawings, and said member 5 being formed with an end piece 8, formed near its end in its opposite edges with the cut-away or slotted parts 9, so as to provide a head or holding portion 10, substantially as shown and for the purposes presently more fully described.

Having thus described the general construction of the cork or stopper extractor embodying the principles of this invention, I will now briefly state the manner of applying the same to the cork and bottle and also the manner of using it for the extraction of the cork.

After having provided the strap-shaped blank preferably of the construction shown in Fig. 5 of the drawings the blank is bent into the conformation shown in Fig. 2 of the drawings, thus providing the central portion 3 with a pair of upwardly-extending and preferably slight outwardly-inclining arms, (in other words, the strap members 4 and 5,) formed at their tops with the curved or bent portions 11, from which extend in downward directions the respective end pieces 7 and 8.

Thus it will be seen that a pair of clamps are provided which permit of the device being arranged in the manner shown in said Fig. 2 of the drawings partly within the mouth and partly over and down the opposite sides of the upper portion of the neck of the bottle prior to the feeding of the cork or stopper in its position (indicated in Fig. 2) directly over the mouth of the bottle, to be finally forced into its sealing position by the plunger of the corking-machine in the usual manner. The downward movement of the plunger or the force applied upon the upper unobstructed surface of the cork drives the cork firmly and securely into the mouth of the neck of the bottle without distorting any portions of the extractor, and thereby destroying its usefulness, the various parts assuming substantially the positions indicated in Figs. 3 and 4 of the drawings. The turned-over members or portions 6 and 8 are then left in the positions closely hugging the outer faces of the neck of the bottle, which makes it very convenient for packing. It will be evident also that the extractor cannot possibly be injured or become displaced, and at the same time a finished and artistic appearance will be the result.

When it is desired to extract the cork or stopper, all the purchaser of the package has to do is to bend the end pieces in an upward direction, curving them toward each other substantially in the manner shown in Fig. 1 of the drawings, and then by slightly twisting the lock or holding member at the one end of the device and inserting it through the opening at the other end, bringing the two end portions or pieces 6 and 8 of the device in holding engagement, as clearly shown. In this manner a perfect loop or pull portion is produced, the same projecting sufficiently above the upper end or face of the cork for the insertion of one or more fingers beneath the connected end pieces and providing a simple and strong means for readily and quickly pulling the cork. The device is preferably provided with an enlarged central portion 3, which is fitted against the under side or face of the cork to prevent cutting into the body of the cork; but this enlarged central portion is not of itself a necessity.

It will be evident that the shaping up of the extractor-strap, as shown in said Fig. 2, is unique in that it successfully solves the problem of rapidly handling the corks and applying the extractor with corking-machines. The bent or shaped-up extractor-straps are quickly dropped or inserted into the mouths of the necks of the bottles after they are filled, and the operator without changing the present methods simply grasps the bottle below the top of its neck and by firmly holding the two downwardly turned or bent end pieces of the strap without special effort prevents the great force and contraction of the cork during the corking opertion from causing the strap to shift or change its position. Then after the cork has been forced in no further operation is necessary and no further attention on the part of the operator is required. A further advantage is that the invention enables the extraction of the cork whole without destroying its usefulness, and the cork can be used over and over, so as to prevent the partly-extracted contents of the bottle being injured or made useless by evaporation or by the air coming in contact with the contents.

The reference character 12 (see Fig. 5) indicates a suitable coating of chemicals or paraffin, which renders the metal extractor-strap positively proof to corrosion or contamination by coming in contact with the contents of the bottle, and it is due to this that the metal or other suitably-made extractor-strap can be passed directly under the cork.

Various means for separably connecting or locking the end pieces of the extractor-straps may be used. Thus in Fig. 6 the end pieces 6 and 8 may be made with the holding or locking means 13 and 14, in Fig. 7 with the holding or locking means 15 and 16, in Fig. 8 with the holding or locking means 17 and 18, in Fig. 9 with the holding or locking means 19 and 20, and in Fig. 10 with the holding or locking means 21 and 22, all of which can be easily engaged and brought into their locked or holding engagement, as will be readily understood from an inspection of said Figs. 6 to 10, inclusive.

In the construction represented in Fig. 11 of the drawings one of the end members or pieces 6 of the strap is made with an eyelet-shaped retaining member 23, formed with an upwardly-extending bead 24, over which is sprung and then forced beneath the lower marginal edge 25 of said bead the marginal edge 26 of a correspondingly-formed hole or opening 27 in the other end member or piece 8. If desired, the two end pieces 4 and 8 of the extractor-strap may be made concavo-convex, as at 28 and as clearly indicated, these portions being made to register by resting one concavo-convex portion over the other concavo-convex portion when the end pieces are connected in a manner similar to that indicated in Fig. 1 of the drawings, a suitable loop or finger-piece having its under surface made convex, so as to avoid any danger of the marginal edges cutting into the finger or fingers when in the act of extracting or pulling the cork.

In Figs. 14 and 15 of the drawings is shown another modified construction of extractor-strap, in which the strap is made near one end with an enlargement 29, from which extends a short end piece 30, having a holding member 31. Extending from the opposite end of said enlargement 29 is a long strap or band 32, the free end of which is made with an opening or receiving portion 33. In practice this form of extractor-strap is arranged about the cork or stopper, the holding member 31 of the end piece 30 being hooked or fastened to the receiving portion 33, which extends slightly above the upper face of the cork, at the one side of the same, so that the enlargement 29 is bent, as shown in Fig. 14, and thereby provides a suitable finger-piece, as will be clearly evident.

If desired, the extractor-strap may be made as indicated in Fig. 16 of the drawings, in which case the body 35 is made with a long opening flanked by a pair of parallel strap-like members 37, which are to be arranged about the body of the cork or stopper in the manner hereinabove described. At one end the said strap is made with a receiving-opening 38, and at its opposite end are two slits 39 and a spear or other suitably shaped holding member 40. The purpose of this arrangement of the two strap members is to produce additional strength, as will be clearly evident. If desired, each strap member 37 may be formed with an outwardly-curved part 41, as indicated in Fig. 17, whereby a central supporting portion which is adapted to be arranged against the under surface of the cork or stopper is provided.

I claim—

1. A cork or stopper extractor of the character set forth, consisting of a flexible metallic band comprising a central portion and a pair of normally upwardly extending and slightly outwardly inclining arms, arranged for the ready insertion of the same in the mouth of a bottle, a curved portion at the end of each arm for suspension over oppositely-located points of the annular marginal edge of the mouth of the bottle, and an end piece extending downwardly from each curved portion adapted to clamp the outer side of the neck of the bottle, and all arranged so that the insertion of a cork or stopper will spread said outwardly-inclining arms, so that the extractor will be tightly retained in the neck of the bottle when the cork or stopper is driven home, substantially as and for the purposes set forth.

2. A cork or stopper extractor of the character set forth, consisting of a flexible metallic band comprising a central portion and a pair of normally upwardly extending and slightly outwardly inclining arms, arranged for the ready insertion of the same in the mouth of a bottle, a curved portion at the end of each arm for suspension over oppositely-located points of the annular marginal edge of the mouth of the bottle, and an end piece extending downwardly from each curved portion adapted to clamp the outer side of the neck of the bottle, and all arranged so that the insertion of a cork or stopper will spread said outwardly inclining arms, so that the extractor will be tightly retained in the neck of the bottle when the cork or stopper is driven home, and locking devices at the free ends of said end pieces, adapted to be brought in interlocking engagement when said end pieces are bent upwardly to provide a pull-loop, substantially as and for the purposes set forth.

3. A cork or stopper extractor of the character set forth, consisting of a flexible metallic band comprising a central portion and a pair of normally upwardly extending and slightly outwardly inclining arms, arranged for the ready insertion of the same in the mouth of a bottle, a curved portion at the end of each arm for suspension over oppositely-located points of the annular marginal edge of the mouth of the bottle, and an end piece extending downwardly from each curved portion adapted to clamp the outer side of the neck of the bottle, and all arranged so that the insertion of a cork or stopper will spread said outwardly-inclining arms, so that the extractor will be tightly retained in the neck of the bottle when the cork or stopper is driven home, one of said end pieces being formed with an opening, and the other end piece having oppositely-extending slots and a holding-head, all arranged to be brought in interlocking engagement when said end pieces are bent upwardly to provide a pull-loop, substantially as and for the purposes set forth.

4. A cork or stopper extractor of the character set forth, consisting of a flexible metallic band comprising a central portion and a pair of normally upwardly extending and slightly outwardly inclining arms, arranged for the ready insertion of the same in the mouth of a bottle, a curved portion at the end of each arm for suspension over oppositely-located points of the annular marginal edge of the mouth of the bottle, and an end piece extending downwardly from each curved portion adapted to clamp the outer side of the neck of the bottle, and all arranged so that the insertion of a cork or stopper will spread said outwardly-inclining arms, so that the extractor will be tightly retained in the neck of the bottle when the cork or stopper is driven home, and a coating element over said extractor to prevent corrosion or contamination from the contents of the bottle, substantially as and for the purposes set forth.

5. A cork or stopper extractor of the character set forth, consisting of a flexible metallic band comprising a central portion and a pair of normally upwardly extending and slightly outwardly inclining arms, arranged for the ready insertion of the same in the mouth of a bottle, a curved portion at the end of each arm for suspension over oppositely-located points of the annular marginal edge of the mouth of the bottle, and an end piece extending downwardly from each curved portion adapted to clamp the outer side of the neck of the bottle, and all arranged so that the insertion of a cork or stopper will spread said outwardly-inclining arms, so that the extractor will be tightly retained in the neck of the bottle when the cork or stopper is driven home, and locking devices at the free ends of said end pieces, adapted to be brought in interlocking engagement when said end pieces are bent upwardly to provide a pull-loop, and a coating element over said extractor to prevent corrosion or contamination from the contents of the bottle, substantially as and for the purposes set forth.

6. A cork or stopper extractor of the character set forth, consisting of a flexible metallic band comprising a central portion and a pair of normally upwardly extending and slightly outwardly inclining arms, arranged for the ready insertion of the same in the mouth of a bottle, a curved portion at the end of each arm for suspension over oppositely-located points of the annular marginal edge of the mouth of the bottle, and an end piece extending downwardly from each curved portion adapted to clamp the outer side of the neck of the bottle, and all arranged so that the insertion of a cork or stopper will spread said outwardly-inclining arms, so that the extractor will be tightly retained in the neck of the bottle when the cork or stopper is driven home, one of said end pieces being formed with an opening, and the other end piece having oppositely-extending slots and a holding-head, all arranged to be brought in interlocking engagement when said end pieces are bent upwardly to provide a pull-loop, and a coating element over said extractor to prevent corrosion or contamination from the contents of the bottle, substantially as and for the purposes set forth.

7. A cork or stopper extractor of the character set forth, consisting of a flexible metallic band comprising an enlarged central portion and a pair of narrow and normally upwardly extending arms, adapted to be inserted in the mouth of a bottle, a curved portion at the end of each arm for suspension over oppositely-located points of the annular marginal edge of the mouth of the bottle, and an end piece extending downwardly from each curved portion adapted to clamp the outer side of the neck of the bottle, each end piece being of greater width than the width of each arm, and all arranged so that the insertion of a cork or stopper will tightly retain the stopper in position relative to the neck of the bottle when the cork or stoppper is driven home, substantially as and for the purposes set forth.

8. A cork or stopper extractor of the character set forth, consisting of a flexible metallic band comprising an enlarged central portion and a pair of narrow and normally upwardly extending arms, adapted to be inserted in the mouth of a bottle, a curved portion at the end of each arm for suspension over oppositely-located points of the annular marginal edge of the mouth of the bottle, and an end piece extending downwardly from each curved portion adapted to clamp the outer side of the neck of the bottle, each end piece being of greater width than the width of each arm, and all arranged so that the insertion of a cork or stopper will tightly retain the stopper in position relative to the neck of the bottle when the cork or stopper is driven home, and locking devices at the free ends of said end pieces, adapted to be brought in interlocking engagement when said end pieces are bent upwardly to provide a pull-loop, substantially as and for the purposes set forth.

9. A cork or stopper extractor of the character set forth, consisting of a flexible metallic band comprising an enlarged central portion and a pair of narrow and normally upwardly extending arms, adapted to be inserted in the mouth of a bottle, a curved portion at the end of each arm for suspension over oppositely-located points of the annular marginal edge of the mouth of the bottle, and an end piece extending downwardly from each curved portion adapted to clamp the outer side of the neck of the bottle, each end piece being of greater width than the width of each arm, and all arranged so that the insertion of a cork or stopper will tightly retain the stopper in position relative to the neck of the bottle when the cork or stopper is driven home, one of said end pieces being formed with an opening, and the other end piece having oppositely-extending slots and a holding-head, all arranged to be brought in interlocking engagement when said end pieces are bent upwardly to provide a pull-loop, substantially as and for the purposes set forth.

10. A cork or stopper extractor of the character set forth, comprising a metallic extractor element provided with a normally bent U-shaped portion, and provided with means for suspending said portion from the annular marginal edge of the mouth of a bottle, all arranged to provide an unobstructed entrance for a cork to be driven into the neck of the bottle by means of a corking-machine, substantially as and for the purposes set forth.

11. A cork or stopper extractor of the character set forth, comprising a metallic extractor element provided with a normally bent U-shaped portion, a pair of curved portions connected with said U-shaped portion for suspending said portion from the annular marginal edge of the mouth of a bottle, and an end piece extending downwardly from each curved portion adapted to clamp the outer side of the neck of the bottle, all arranged to provide an unobstructed entrance for a cork to be driven into the neck of the bottle by means of a corking-machine, and locking devices at the free ends of said end pieces, adapted to be brought in interlocking engagement when said end pieces are bent upwardly to provide a pull-loop, substantially as and for the purposes set forth.

In testimony that I claim the invention set forth above I have hereunto set my hand this 23d day of October, 1906.

JOSEPH B. SHORT.

Witnesses:
   FREDK. C. FRAENTZEL,
   F. H. W. FRAENTZEL.